(12) United States Patent
Lin et al.

(10) Patent No.: US 12,141,448 B2
(45) Date of Patent: Nov. 12, 2024

(54) VOLUME PROMOTION MANAGEMENT AND VISUALIZATION IN A METRO CLUSTER

(71) Applicant: Dell Products L.P., Round Rock, TX (US)

(72) Inventors: Binbin Liu Lin, Sudbury, MA (US); Patricia Barry Campbell, Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 18/162,884

(22) Filed: Feb. 1, 2023

(65) Prior Publication Data

US 2024/0256147 A1     Aug. 1, 2024

(51) Int. Cl.
    *G06F 3/06*             (2006.01)

(52) U.S. Cl.
    CPC .......... *G06F 3/0619* (2013.01); *G06F 3/0629* (2013.01); *G06F 3/067* (2013.01)

(58) Field of Classification Search
    CPC ....... G06F 3/0619; G06F 3/0629; G06F 3/067
    See application file for complete search history.

(56) References Cited

U.S. PATENT DOCUMENTS

2022/0114061 A1*    4/2022    Meiri ..................... G06F 3/067

* cited by examiner

*Primary Examiner* — Aracelis Ruiz
(74) *Attorney, Agent, or Firm* — Krishnendu Gupta; Deepika Bhayana; Derek Lam

(57) ABSTRACT

Techniques are disclosed for volume promotion management and visualization in a metro cluster. For example, a system can include a processor coupled to a memory, the processor configured to: receive a promotion request directed to a selected volume of a cluster volume, wherein the cluster volume is established between a first volume in a first array and a second volume in a second array, the selected volume being one of the first and second volume; collect metrics that indicate respective characteristics associated with the cluster volume; and in response to receiving the request: compare the metrics with a database that associates permutations of metrics with respective conditions for promoting the selected volume, determine, based on the comparison, a target condition set having a permutation of metrics that matches the metrics, and perform a promotion procedure on the selected volume upon a determination that the target condition set is satisfied.

20 Claims, 6 Drawing Sheets

| METRO-VOLUME METRICS 274 | | | | | | |
|---|---|---|---|---|---|---|
| METRO VOLUME ID | LOCAL ROLE | LOCAL HOST ACCESSIBILITY | LOCAL METRO STATE | NETWORK CONNECTIVITY | REMOTE ROLE | REMOTE HOST ACCESSIBILITY | REMOTE METRO STATE |
| ..... 274a | ... | ... | ... | ... | ... | ... | ... |

FIG. 4

VOLUME PROMOTION MANAGEMENT AND VISUALIZATION IN A METRO CLUSTER

FIELD

Example embodiments generally relate to data storage, e.g., storage volume management in a data storage cluster. More specifically, at least some embodiments relate to systems, hardware, software, computer-readable media, and methods for promoting a storage volume in a metro cluster.

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some data storage systems, also called "arrays," provide data access using metro clusters. "Metro clusters" are storage deployments in which two volumes hosted from respective arrays at respective sites are synchronized and made to appear as a single volume to application hosts. Such volumes are sometimes called metro or "stretched" volumes because they appear to be stretched between two arrays. Primary advantages of metro clusters include increased data availability, disaster tolerance, resource balancing across datacenters, and storage migration.

An array may be assigned a "preferred" or "non-preferred" role, which determines how synchronization is carried out across the arrays. Sometimes, a failure may occur on an array. When a failure occurs on a preferred array, synchronization between the arrays is halted and the metro-cluster becomes fractured, meaning that both arrays stop serving I/O. In response, an administrator or other user of a metro-cluster may wish to enable host and production access to the non-preferred array, so as to allow the preferred array time to recover.

SUMMARY

Unfortunately, administrators are not always consistent in their activities and sometimes errors can result when promoting a volume of a metro cluster. Risks of undesired data loss and corruption are possibilities if proper conditions are not met or proper steps are not taken. Such risks can discourage parties from adopting metro-cluster solutions and may lead to a false impression that metro clusters are too complicated for small and medium-sized organizations, which may lack full time administrators. What is needed, therefore, is a way of reducing risks associated with promotion, so that data loss and corruption are avoided and users can administer their metro clusters with greater confidence.

The above need is addressed at least in part by an improved technique for promoting metro volumes. The technique includes receiving a promotion request directed to a selected volume of a cluster volume, wherein the cluster volume is established between a first volume in a first array and a second volume in a second array, and the selected volume is one of the first and the second volume. The technique further includes collecting a plurality of metrics that indicate respective characteristics associated with the cluster volume. The technique further includes, in response to receiving the promotion request, comparing the plurality of metrics with a database that associates multiple permutations of metrics with respective conditions for promoting the selected volume, determining, based at least in part on the comparison, a target condition set having a permutation of metrics that matches the plurality of metrics, and performing a promotion procedure on the selected volume upon a determination that the target condition set is satisfied.

Advantageously, the improved technique simplifies the task of promotion for a particular volume on a metro volume. Rather than relying on the administrator's expertise in verifying every condition perfectly prior to a promotion procedure, the improved technique instead operates based on pre-defined, known-good conditions specifically selected based on current circumstances. Preferably, the promotion procedure is performed automatically and results from the promotion procedure can be visualized in advance of performing the procedure, thus further simplifying activities and reducing risks so as to protect users from undesired data corruption.

In some embodiments, the first volume and the second volume can be configured to perform bidirectional replication. The plurality of metrics can include a state of network connectivity between the first array and the second array. The state of network connectivity can indicate that a bidirectional replication session between the first volume and the second volume has been fractured or paused. The plurality of metrics can include a state of host availability of the first volume and/or a state of host availability of the second volume. The plurality of metrics can include a role of a particular array that received the promotion request as a one of a preferred array or a non-preferred array. The promotion procedure can be performed automatically without user intervention. Performing the promotion procedure can further include enabling production access on the selected volume. The selected volume can be the first volume. Enabling production access can include enabling host access and application access on the first volume to allow access to the cluster volume upon a determination that the second volume is unavailable. The at least one processing device can be further configured to implement the following steps: prior to enabling production access: taking a snapshot of the selected volume, and disabling snapshot creation on the selected volume, and resuming snapshot creation on the selected volume only after completion of enabling production access. Resuming snapshot creation on the selected volume can further include enabling a data protection policy for the selected volume, wherein the data protection policy includes one or more snapshot rules. The at least one processing device can be further configured to implement the following steps: in response to receiving the promotion request: determining a result of the promotion procedure; generating a preview of the result; and visualizing the preview of the result before performing the promotion procedure; wherein the promotion procedure is performed in response to receiving, from a user, an acknowledgment of the preview of the result. The selected volume can be a non-preferred volume. The cluster volume can be a metro volume.

Other embodiments are directed to a computerized apparatus constructed and arranged to perform a method of promoting a volume of a cluster volume, such as the method described above. Still other embodiments are directed to a computer program product. The computer program product stores instructions which, when executed on control circuitry of a computerized apparatus, cause the computerized apparatus to perform a method of promoting a volume of a metro volume, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIG. 4 is a block diagram of example metro-volume metrics of FIG. 2.

DETAILED DESCRIPTION

Example embodiments relate to storage volume management in a data storage cluster. In particular, example embodiments relate to promoting a storage volume in a metro cluster.

An improved technique for promoting a selected volume of a metro cluster volume includes collecting a plurality of metrics that indicate respective characteristics associated with the metro volume. In response to receiving a request to promote a selected volume on the metro volume, the technique includes comparing the plurality of metrics with a database that associates multiple permutations of metrics with respective conditions for promoting the selected volume. The technique further includes determining, based on the comparison, a target condition set having a permutation of metrics that matches the plurality of metrics, and performing the promotion procedure upon a determination that the target condition set is satisfied.

Target procedures are preferably performed automatically by an array that participates in the metro cluster. Performing the promotion procedure can include enabling production access on the selected volume, upon a determination that the target condition set is satisfied. The task of the administrator is thus greatly simplified, as is the likelihood of errors.

Embodiments of the improved technique will now be described. It will be appreciated that such embodiments are provided by way of example to illustrate certain features and principles but are not intended to be limiting.

Figure 1:
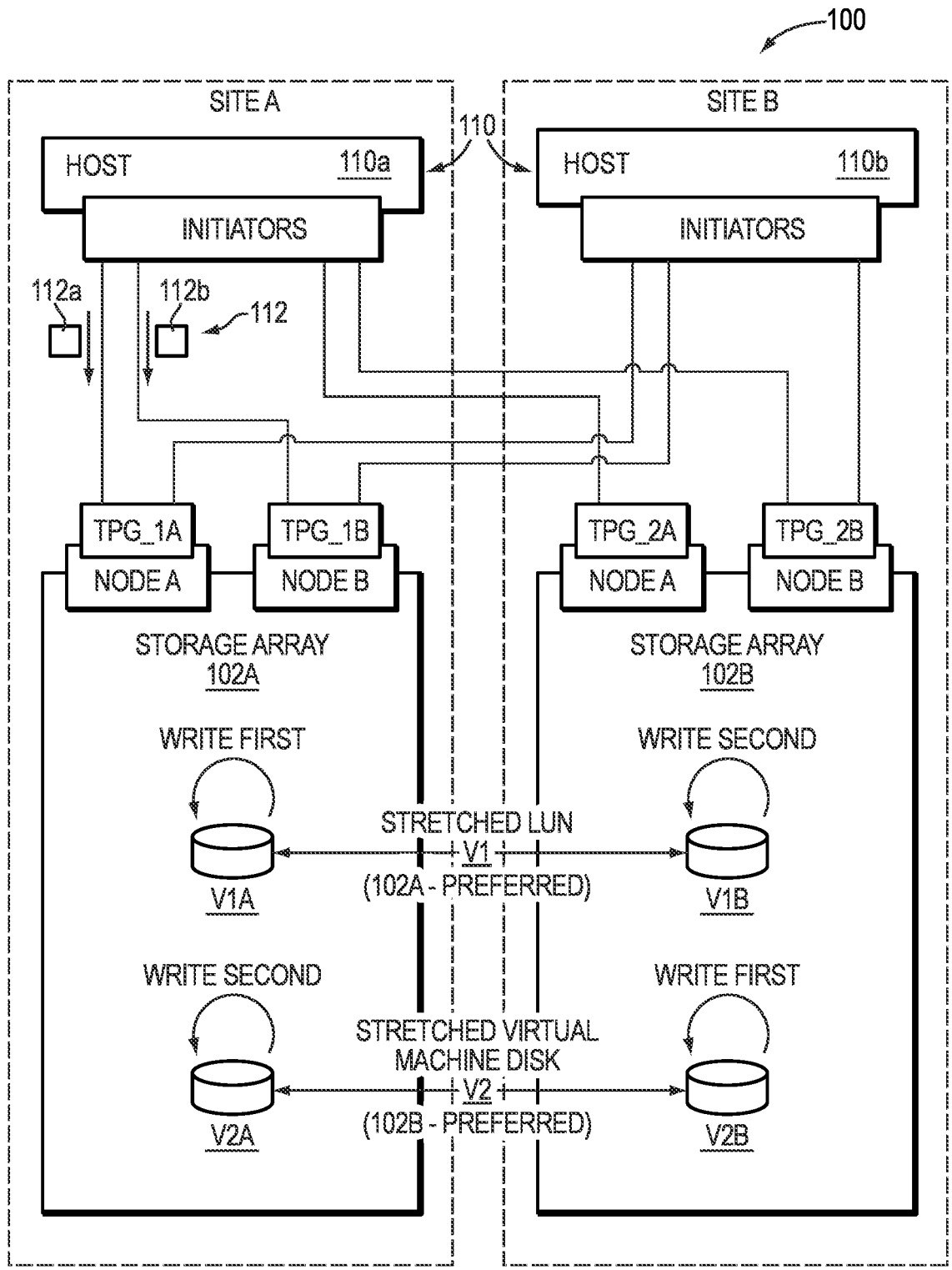
FIG. 1 is a block diagram of an example metro-cluster environment in which embodiments of the improved technique can be practiced.

FIG. 1 shows an example metro-cluster environment 100 in which embodiments of the improved technique can be practiced. Here, a first array 102A operates at Site A and a second array 102B operates at Site B. Each array 102 may include one or more storage computing nodes (e.g., Node A and Node B) as well as persistent storage, such as magnetic disk drives, solid state drives, and/or other types of storage drives. Site A and Site B may be located in different data centers, different rooms within a data center, different locations within a single room, different buildings, or the like. Site A and Site B may be geographically separate but are not required to be. Generally, to meet customary metro cluster requirements, Site A and Site B may be separated by no more than 100 km.

Environment 100 further includes hosts 110 (e.g., host 110a and host 110b). Hosts 110 run applications that store their data on Array 102A and/or Array 102B. The hosts 110 may connect to arrays 102 via a network, such as a storage area network (SAN), a local area network (LAN), a wide area network (WAN), the Internet, and/or some other type of network or combination of networks, for example.

Each array 102 is capable of hosting multiple data objects, such as host-accessible LUNs (Logical UNits), file systems, and virtual machine disks, for example, which the array may store internally in the form of "volumes." Internal volumes may also be referred to as LUNs, i.e., the terms "volume" an "LUN" may be used interchangeably herein when referring to internal representations of data objects. Some hosted data objects may be "stretched," meaning that they are deployed in a metro-cluster arrangement in which they are accessible from both arrays 102A and 102B, e.g., in an Active-Active manner, with their contents being maintained in synchronization. For example, volume V1 may represent a stretched LUN and volume V2 may represent a stretched virtual machine disk.

Environment 100 may present each stretched data object to hosts 110 as a single virtual object, even though the virtual object is maintained internally as a pair of objects, with one object of each pair residing on each array. In the example shown, stretched volume V1 (a LUN) resolves to a first volume V1A in array 102B and a second volume V1B in array 102B. Likewise, stretched volume V2 (a virtual machine disk) resolves to a first volume V2A in array 102A and a second volume V2B in array 102B. One should appreciate that each of the arrays 102A and 102B may host additional data objects (not shown) which are not deployed in a metro-cluster arrangement and are thus local to each array. Thus, metro clustering may apply to some data objects in the environment 100 but not necessarily to all.

As further shown, each array 102 may be assigned as a "preferred array" or a "non-preferred array." Preference assignments are made by arrays 102 and may be automatic or based on input from an administrator, for example. In some examples, array preferences are established on a per-data-object basis. Thus, for stretched LUN (V1), array 102A may be assigned as the preferred array and array 102B may be assigned as the non-preferred array. The reverse may be the case for stretched vVol (V2), where array 102B may be assigned as preferred and array 102A as non-preferred.

Assignment of an array as preferred or non-preferred determines how synchronization is carried out across the two arrays. For example, when a write request to a data object is received (e.g., from one of the hosts 110), the preferred array for that data object is always the first array to persist the data specified by the write request, with the non-preferred array being the second array to persist the data. This is the case regardless of whether the preferred array or the non-preferred array is the one that receives the write request from the host. Thus, a first write request received by the preferred array is written first to the preferred array, but also a second write request received by the non-preferred array is written first to the preferred array. One way of understanding preferred and non-preferred arrays is that a preferred array is the one that users prefer to remain available in the event of a loss of connectivity between the two arrays.

As a particular example, assume that Host 110a issues an I/O request 112a specifying a write of host data to the stretched LUN (V1), with array 102A being the target. Array 102A receives the write request 112a and checks whether it is preferred or non-preferred for the referenced data object, stretched LUN V1. In this example, array 102A is preferred, so Array 102A persists the data first ("Write First"), by writing to V1A. Only after such data are persisted on array 102A does array 102A replicate the write request 112a to array 102B, which then proceeds to "Write Second" to V1B.

But assume now that Host 110a issues an I/O request 112b specifying a write of host data to the stretched virtual machine disk (V2), again with array 102A being the target. Array 102A receives the write request and checks whether it is preferred or non-preferred for the stretched virtual machine disk. In this case, array 102A is non-preferred, so array 102A forwards the write request 112b to array 102B (preferred), which proceeds to "Write First" to V2B. Only after array 102B has persisted this data does array 102B send control back to array 102A, which then proceeds to "Write Second" to V2A.

Although both examples above involve array 102A being the target of the write requests 112a and 112b, similar results follow if array 102B is the target. For example, if request 112a arrives at array 102B, array 102B determines that it is non-preferred for V1 and forwards the request 112a to array 102A, which would then write first to V1A. Only then does request 112a return back to array 102B, which writes second to V1B. As for write request 112b, array 102B determines that it is preferred and writes first to V2B, and then forwards the request 112b to array 102B, which then writes second to V2A.

The disclosed protocol of writing first to the preferred array brings many benefits. As the array preference for any data object is known in advance, it is assured that the preferred array always stores the most up-to-date data. If a link between the arrays fails or the data on the two arrays get out of sync for any reason, it is known that the most recent data can be found on the preferred array. Additional information about metro clusters employing a write-first protocol for preferred arrays may be found in co-pending U.S. patent application publication number 2022/0236877, filed Jan. 22, 2021, the contents and teachings of which are incorporated herein by reference in their entirety.

Figure 2:
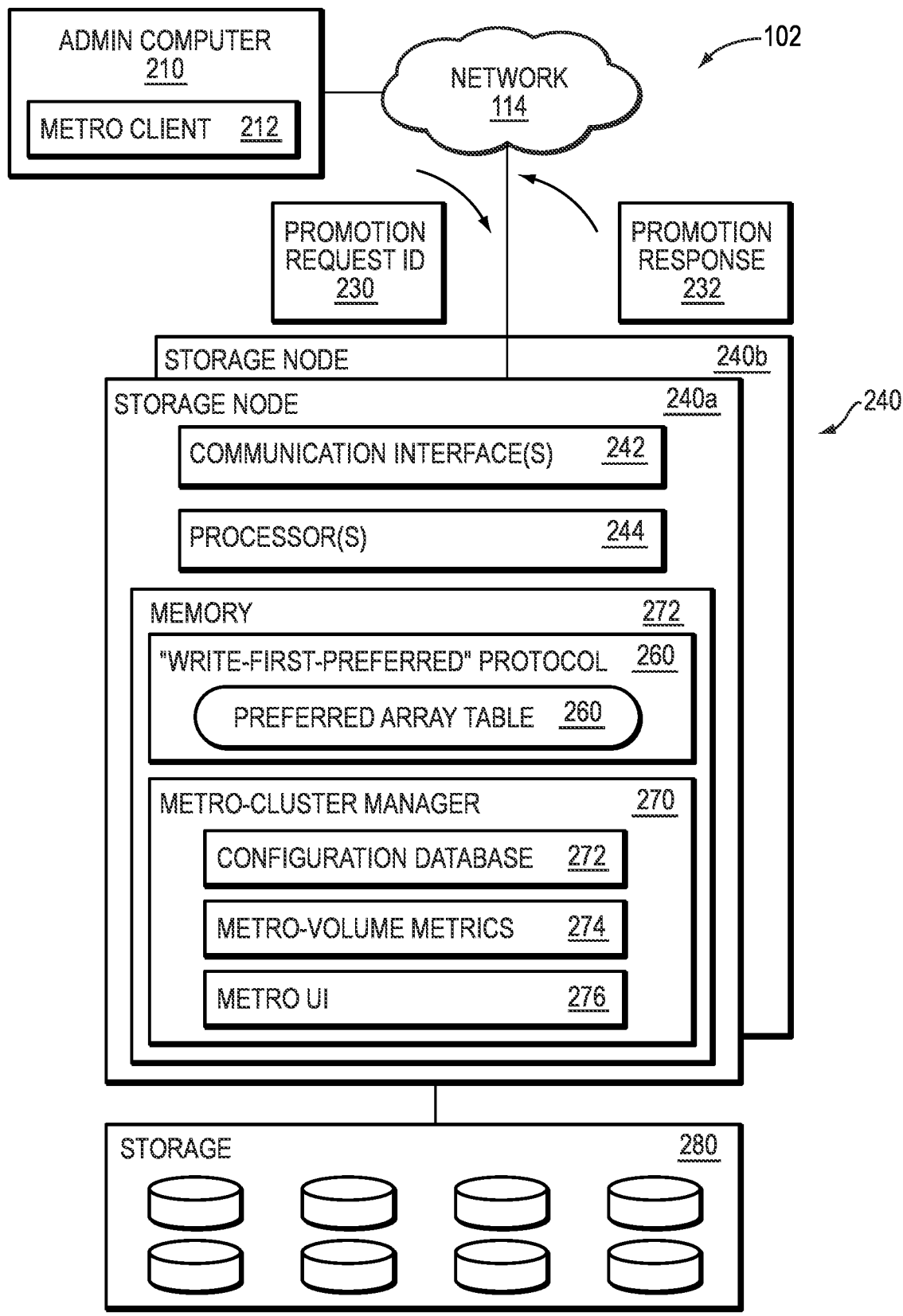
FIG. 2 is a block diagram of an example array of the metro-cluster environment of FIG. 1.

FIG. 2 shows an example arrangement of a storage array 102 of FIG. 1 in greater detail. Array 102 may be representative of array 102A and array 102B. There is no requirement that the two arrays 102A and 102B be identical, however.

Array 102 is seen to include a pair of storage nodes 240 (i.e., 240a and 240b; also called storage processors, or "SPs"), as well as storage 280, such as magnetic disk drives, electronic flash drives, and/or the like. Nodes 240 may be provided as circuit board assemblies or blades, which plug into a chassis that encloses and cools the nodes 240. The chassis has a backplane or midplane for interconnecting the nodes, and additional connections may be made among nodes using cables. In some examples, nodes 240 are part of a storage cluster, such as one which contains any number of storage appliances, where each appliance includes a pair of nodes 240 connected to shared storage devices. No particular hardware configuration is required, however.

As shown, node 240a includes one or more communication interfaces 242, a set of processors 244, and memory 250. The communication interfaces 122 include, for example, SCSI target adapters and/or network interface adapters for converting electronic and/or optical signals received over a network to electronic form for use by the node 240a. They may further include, in some examples, NVMe-oF (Nonvolatile Memory Express over Fabrics) ports. The set of processors 244 includes one or more processing chips and/or assemblies, such as numerous multi-core CPUs (central processing units). The memory 250 includes both volatile memory, e.g., RAM (Random Access Memory), and non-volatile memory, such as one or more ROMs (Read-Only Memories), disk drives, solid state drives, and the like. The set of processors 244 and the memory 250 together form control circuitry, which is constructed and arranged to carry out various methods and functions as described herein. Also, the memory 250 includes a variety of software constructs realized in the form of executable instructions. When the executable instructions are run by the set of processors 244, the set of processors 244 is made to carry out the operations of the software constructs. Although certain software constructs are specifically shown and described, it is understood that the memory 250 typically includes many other software components, which are not shown, such as an operating system, various applications, processes, and daemons.

As further shown in FIG. 2, the memory 250 "includes," i.e., realizes by execution of software instructions, a write-first-preferred protocol 260 and a metro-cluster manager 270. The write-first-preferred protocol 260 is configured to manage tasks associated with writing first to preferred arrays and writing second to non-preferred arrays, and thus helps to avoid deadlocks and maintain synchronization of data objects across the metro-cluster environment 100. In some examples, the write-first-preferred protocol 260 includes a preferred array table 262, e.g., a data structure that assigns data objects hosted by the local array 102 to corresponding preferred arrays and, in some cases, to corresponding non-preferred arrays (e.g., if not implied). Contents of the preferred array table 262 may be established by the node 240a based on input from a system administrator or automatically, e.g., based on any desired criteria, such as load distribution, location of arrays and/or hosts, network topology, and the like. In some examples, preferred array table 262 is replicated across arrays 102, such that all involved arrays have the same table of assignments.

The metro-cluster manager 270 is configured to manage metro volumes in the environment 100. Managing metro volumes may include, among other things, providing features for supporting promotion functionality. To this end, the metro-cluster manager 270 may include a configuration database 272, metro-volume metrics 274, and a metro user interface (UI) 280.

The configuration database 272 is configured to associate multiple permutations (scenarios) of criteria relevant to metro volumes with respective conditions for promoting a selected volume. The configuration database 272 thus provides a vehicle for identifying appropriate conditions for performing a promotion procedure based on given scenarios.

The metro-volume metrics 274 include metrics specific to particular metro-volumes hosted by the array 102. In an example, metro-volume metrics 274 change over time as circumstances change, e.g., to reflect changing conditions of metro volumes, to include new metro volumes, to remove deleted metro volumes, and to remove metro volumes that have been changed to standalone volumes.

The metro UI 276 is configured to provide a user interface of the metro-cluster manager 270, for enabling administrators and other users to manage metro volumes. For example, a user may log onto the cluster manager 270 from a separate admin computer 210, which is connected to the array 102 via a network 220. The admin computer 210 may run a metro client 212, which is configured to communicate with the cluster manager 270 using the metro UI 276. In an example, the metro UI 276 includes a GUI (graphical user interface) as part of a web application, and the metro client 212 includes a browser, which downloads and displays pages of the GUI. Alternatives to a GUI may include a CLI (command line interface) and/or a REST (representational state transfer) API (application programming interface), for example. In some examples, the metro-cluster manager 270 provides all three types of user interfaces. Although a separate admin computer 210 is shown, this is merely an example. For instance, the array 102 may include its own local terminal that performs similar functions.

In example operation, a user desires to promote a selected volume in a metro volume. Assume, for purposes of illustration, that the metro volume is metro volume V1 of FIG. 1. Assume further that the array of FIG. 2 is array 102A, which hosts the first volume V1A, and that array 102B hosts the second volume V1B. Assume further that the first volume V1A is the selected volume for promotion. The user may wish to promote the volume V1A for any reason, such as because a failure has occurred on the second volume V1B and bidirectional replication between volumes V1A and V1B is stopped; metro clustering is no longer needed on volume V1, because there has been a network outage, or for any other reason. Promoting the volume V1A allows a user to regain access to the metro volume that might otherwise be inaccessible due to the failure of volume V1B.

To begin the promotion process, the user logs on to the metro-cluster manager 270, e.g., using the metro client 212 and the metro UI 276, and issues a request 230 on the UI to promote volume V1A. The request 230 may include an identifier (ID) of the volume to be promoted, such as a name. Alternatively, the identity of the volume to be promoted may be established based on context. For example, the user may be viewing properties of volume V1A when the user issues the request 230.

In response to receiving the promotion request 230, the metro-cluster manager 270 may proceed to determine a target condition set for promoting the selected volume given the current scenario. For example, the metro-cluster manager 270 accesses the metro-volume metrics 274 to obtain a plurality of metrics associated with the identified metro volume (V1). The metrics may include, for example, storage and network settings relevant to the volume V1, the status of bidirectional replication between the participating arrays, and the role of each array (preferred or non-preferred) in the metro volume. The plurality of metrics obtained for the metro volume from the metro-volume metrics 274 thus establishes a current scenario. The metro-cluster manager 270 then compares the plurality of metrics with the permutations (scenarios) identified in the configuration database 272 to determine a target condition set. The metro-cluster manager 270 then determines whether the target condition set is satisfied, e.g., whether the permutation of metrics in the target condition set is met. Upon a determination that the target condition set is satisfied, the metro-cluster manager 270 performs the promotion procedure on the selected volume.

In some examples, the metro-volume metrics 274 include the role of the array that receives the promotion request 230, e.g., whether that array is preferred or non-preferred with respect to the metro-volume. For example, the promotion procedure may require the respective array to be non-preferred. In further examples, the metro-volume metrics 274 include a state of network connectivity between the first array and the second array. For example, the promotion procedure may require that a bidirectional replication session between the first volume and the second volume has been fractured or paused. In further examples, the metro-volume metrics 274 include a state of host availability of the first volume or the second volume.

The metro-cluster manager 270 preferably performs the promotion procedure automatically and without further user input. An example procedure for promoting a selected volume (e.g., V1A or V1B) may include the following actions:

Take a snapshot of the selected volume for use as a recovery snapshot.

Unassign the selected volume from any data protection policy, e.g., to disable snapshot creation on the selected volume, preventing any new snapshots from being made of the selected volume such as part of a regular automated snapshot schedule.

Enable production access on the selected volume for hosts and applications, e.g., to allow access to the metro volume by way of the selected volume.

Reenable any data protection policy on the selected volume, e.g., to reestablish any regular automated snapshot schedule.

Once these acts have been completed, the metro-cluster manager 270 may send a promotion response 232 back to the metro client 212. In an example, the response 232 is sent only after all the above acts have been completed successfully. If any of the acts cannot be completed, the response 232 may return a failure.

The above activities for promoting the selected volume have the effect of restoring access to the metro-volume that might otherwise have been lost when a failure occurs on the other volume and the other volume is preferred. These activities enable host and production access to the selected array and provide an opportunity for the other volume to recover.

Figure 3:
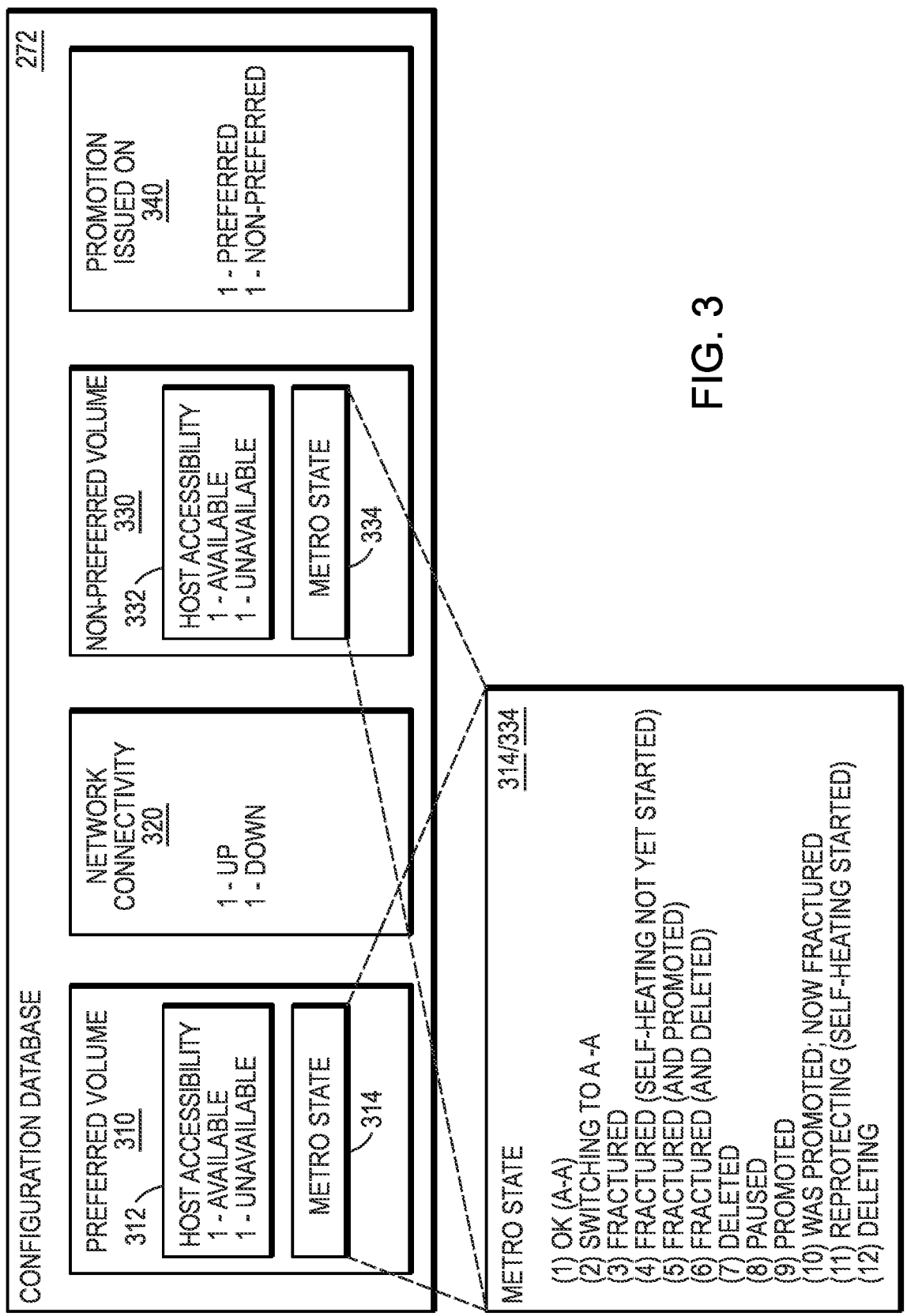
FIG. 3 is a block diagram of an example configuration database of FIG. 2.

FIG. 3 shows an example configuration database 272 in additional detail. The configuration database 272 associates different permutations of metrics with respective conditions for promoting a selected volume. Each permutation, or scenario, is defined as a respective combination of metrics. The metrics defining each scenario may include metrics related to the preferred volume 310, including host accessibility 312 (e.g., available or not available), and metro state 314, which can assume one of multiple values, examples of which are shown in the expanded view to the left below the main figure. The metrics defining each scenario may further include metrics for the non-preferred volume 330 (host accessibility 332 and metro state 334), as well as a metric indicating network connectivity 320, which may be "up" or "down." Up means that there is a functional network connection between the preferred and non-preferred sites, whereas down means that there is no working network connection (e.g., resulting in a bidirectional replication session being fractured or paused). Finally, the metrics defining a scenario further include an indication 340 of which array (e.g., preferred or non-preferred) received the promotion request 230 (e.g., allowing the present system to verify that the array receiving the promotion request is non-preferred). A particular scenario is thus defined as a combination of metrics selected from 312, 314, 320, 332, 334, and 340.

Given the number of options depicted for the various metrics in FIG. 3, the total number of permutations is large. However, the number can be reduced given that some metrics are not independent from each other and some combinations of metrics may not be possible. Thus, the configuration database 272 preferably provides a respective condition set for every foreseeable combination of metrics, rather than for every possible combination.

The various examples of metro states 314, 334, shown to the lower left, are also diverse. Such states reflect the status of metro-cluster replication for the indicated volume ("A-A" refers to normal, Active-Active replication). As mentioned, the promotion procedure operates when metro-cluster replication is generally in the Fractured or Paused state.

FIG. 4 shows example metro-volume metrics 274 of FIG. 2 in additional detail. In an example, the metro-volume metrics 274 include, for each metro volume supported in the array, current values of metrics for the respective metro volume. These current values of metrics align with a particular scenario defined in the configuration database 272, e.g., based on current values of metrics 274a aligning with values of metrics 312, 314, 320, 332, and 334. The value of metric 340 (the array that received the promotion request 230), as well as options accompanying the request 230, are not part of the metro-volume metrics 274, as those metrics are not defined until the request 230 is issued.

A plurality of current metro-volume metrics 274a is provided for a particular metro volume, such as V1, and such plurality corresponds to a particular permutation of metrics (scenario) in the configuration database 272, once the array (340) is confirmed. Thus, in response to a metro request 230, the metro-cluster manager 270 may access current metrics 274a, from the metro-volume metrics 274, for the metro volume indicated by the request 230, and compare those metrics with the database 272 to identify a matching scenario. The metro-cluster manager 270 may determine a target condition set, based on the comparison, where the target condition set has a scenario that matches the plurality of current metro-volume metrics. Upon a determination that the target condition set is satisfied, the metro-cluster manager 270 may then proceed to perform the promotion procedure to satisfy the promotion request 230.

Figure 5:
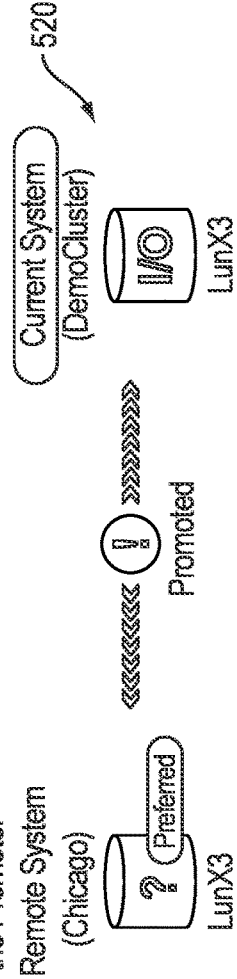
FIG. 5 is an example screenshot of an example metro user interface of FIG. 2.

FIG. 5 shows an example screenshot 500 of the GUI of the metro UI 276, which may be rendered, for example, by the metro client 212 while the metro client 212 is logged into the metro-cluster manager 270. The GUI includes a button 510, which the user may click to issue a promotion request 230 on a specified volume, V1B.

The GUI can include graphics that allow an administrator or other end user to visualize the various metro states 314, 334 and metro-volume metrics 274. For example, the GUI can use storage resource icons to indicate local and remote storage resources such as arrays 102A, 102B or volumes V1A, V1B, V2A, V2B. In some embodiments, color can indicate whether a storage resource is enabled for I/O or not (e.g., active, inactive, unable to communicate). For example, blue can indicate an active storage resource and gray can indicate a disabled or inactive storage resource. To visualize a given bidirectional replication session, arrows can indicate a direction of data flow and color can indicate whether the data flow is currently enabled or not. For example, blue can indicate that data flow is enabled and gray can indicate that data flow is disabled or inactive. Other colors can also be used without departing from the scope of the invention. Additionally, symbols can provide status for managing and monitoring, such as healthy state, failed connection, stretched volume is paused, or stretched volume is resuming or syncing. Indicators can also help the administrator understand the system that the user is currently logged into, and whether the system being managed is preferred or non-preferred.

The GUI may further visualize a state 520 of the metro volume that represents the state after the future completion of the promote request 230. As one example, the state 520 indicates that the bidirectional replication session will be promoted, and production access will be enabled for volume V1B for access by hosts and applications on the current metro cluster after completion of the promote request 230. The present system determines a result of the promotion procedure, and generates a preview of the result. The preview can then be visualized, for example as illustrated in the state 520. Upon receiving an acknowledgement from the user of the state 520, for example by pressing the button 510, the promotion procedure can be performed.

Figure 6:
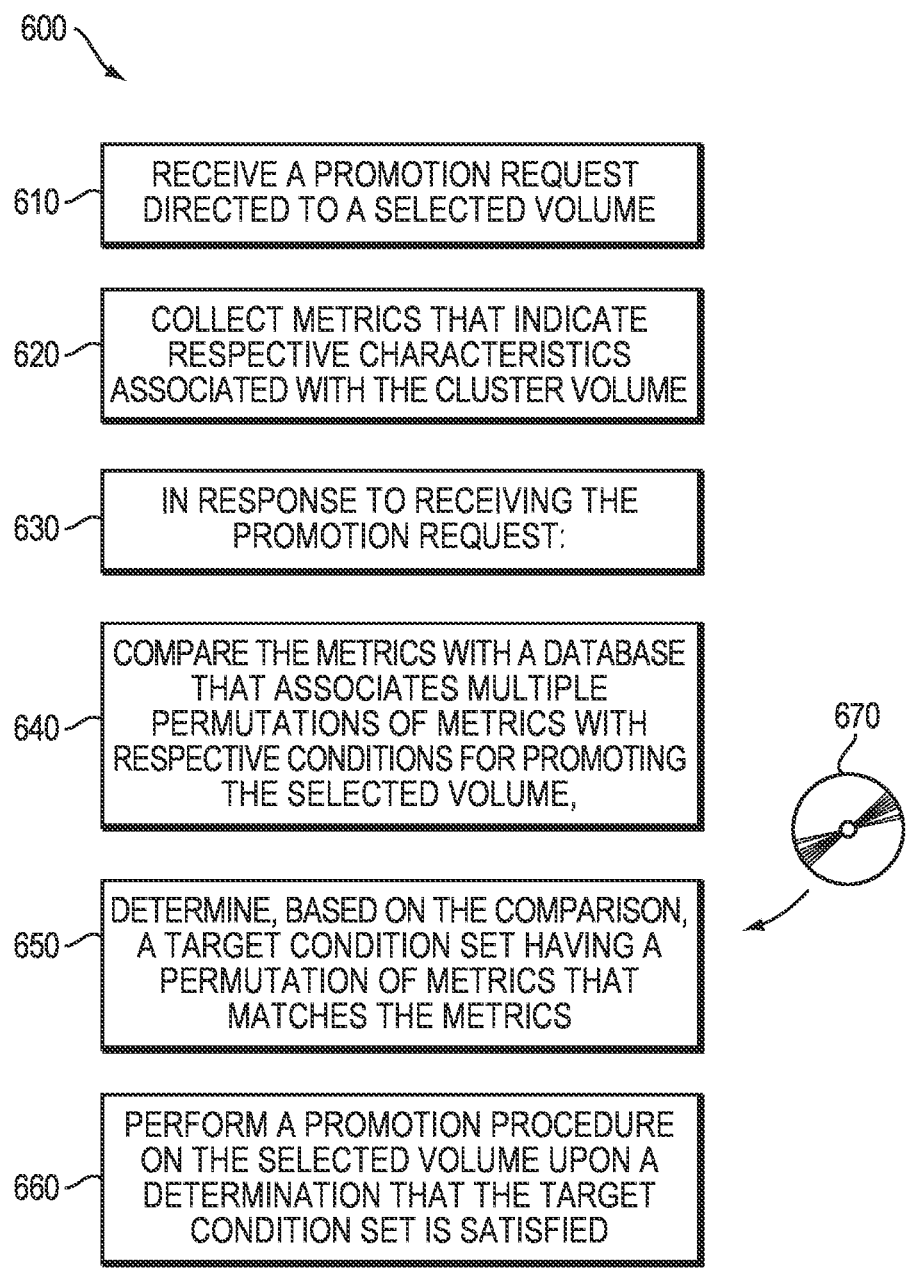
FIG. 6 is a flowchart showing an example method of promoting a selected volume.

FIG. 6 shows an example method 600 that may be carried out in connection with the environment 100 and provides a summary of some of the features described above. The method 600 is typically performed, for example, by the software constructs described in connection with FIG. 2, which reside in the memory 250 of a node 240 of an array 102 and are run by the set of processors 244. The various acts of method 600 may be ordered in any suitable way. Accordingly, embodiments may be constructed in which acts are performed in orders different from that illustrated, which may include performing some acts simultaneously.

In example embodiments, the method 600 includes receiving a promotion request 230 that is directed to a selected volume (e.g., V1B) of a cluster volume (e.g., V1) (step 610). The promotion request 230 may be received by a node 240 on an array 102, for example. The cluster volume is established between a first volume (e.g., V1A) in a first array (e.g., 102A) and a second volume (e.g., V1B) in a second array (e.g., 102B). The cluster volume can be a metro volume. The selected volume can be the first or the second volume. The selected volume can be a non-preferred volume.

In example embodiments, the method 600 includes collecting a plurality of metrics 274 (step 620). The metrics 274 indicate respective characteristics associated with the metro volume. For example, metrics for volume V1 may be collected and maintained in metro-volume metrics 274. Metrics 274 may be collected in real time, e.g., in response to the promotion request 230, or they may be collected earlier and kept current by the metro-cluster manager 270. For example, the first and second volume can be configured to perform bidirectional replication and the plurality of metrics can include a state of network connectivity between the first and second array. The state of network connectivity can indicate that a bidirectional replication session between the first volume and the second volume has been fractured or paused. The metrics can include a role of a particular array that received the promotion request as a preferred or non-preferred array. For example, one condition in the target condition set can include requiring that the particular array be non-preferred. The metrics can include a state of host availability of the first or second volume.

In example embodiments, the method 600 includes, in response to receiving the promotion request 230 (step 630), comparing the plurality of metrics 274 with a database 272 that associates multiple permutations of metrics, e.g., permutations of 312, 314, 320, 332, 334, and 340, with respective conditions for promoting the selected volume (step 640).

In example embodiments, the method 600 includes, based at least in part on the comparison 640, determining a target condition set having a permutation of metrics that matches the plurality of metrics 274 (step 650).

In example embodiments, the method 600 includes performing a promotion procedure on the selected volume, upon a determination 650 that the target condition set is satisfied (step 660). For example, the promotion procedure can be performed automatically without user intervention. Performing the promotion procedure can include enabling production access on the selected volume. For example, the selected volume can be the first volume, and enabling production access can include enabling host access and application access on the first volume, to allow access to the cluster volume upon a determination that the second volume is unavailable.

In example embodiments, the method 600 further includes, prior to enabling production access, taking a snapshot of the selected volume and disabling snapshot creation on the selected volume, and resuming snapshot creation on the selected volume only after completion of enabling production access. In some embodiments, resuming snapshot creation on the selected volume further includes enabling a data protection policy for the selected volume. The data protection policy can include one or more snapshot rules or replication rules.

In example embodiments, the method 600 further includes determining a result 520 of the promotion procedure, generating a preview of the result 520, and visualizing the preview of the result 520 before performing the promotion procedure. The promotion procedure can be performed in response to receiving, from a user, an acknowledgment 510 of the preview of the result 520.

An improved technique has been described for promoting volumes. The technique includes collecting a plurality of metrics 274 that indicate respective characteristics associated with a selected volume of a metro volume. In response to receiving a request 230 to promote the selected volume, the technique includes comparing the plurality of metrics 274 with a database 272 that associates multiple permutations of metrics with respective conditions for promoting the selected volume. The technique further includes determining, based on the comparison, a target condition set having a permutation of metrics that matches the plurality of metrics 274 and performing a promotion procedure on the selected volume upon a determination that the target condition set is satisfied.

Having described certain embodiments, numerous alternative embodiments or variations can be made. For example, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 670 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A system comprising:
   at least one processing device including a processor coupled to a memory;
   the at least one processing device being configured to implement the following steps:
   receiving a promotion request directed to a selected volume of a cluster volume, wherein the cluster volume is established between a first volume in a first array and a second volume in a second array, and the selected volume is one of the first and the second volume;
   collecting a plurality of metrics that indicate respective characteristics associated with the cluster volume; and
   in response to receiving the promotion request:

comparing the plurality of metrics with a database that associates multiple permutations of metrics with respective conditions for promoting the selected volume, determining, based at least in part on the comparison, a target condition set having a permutation of metrics that matches the plurality of metrics, and performing a promotion procedure on the selected volume upon a determination that the target condition set is satisfied.

2. The system of claim 1, wherein the first volume and the second volume are configured to perform bidirectional replication, and wherein the plurality of metrics includes a state of network connectivity between the first array and the second array.

3. The system of claim 2, wherein the state of network connectivity indicates that a bidirectional replication session between the first volume and the second volume has been fractured or paused.

4. The system of claim 3, wherein the plurality of metrics includes a state of host availability of the first volume and/or a state of host availability of the second volume.

5. The system of claim 2, wherein the plurality of metrics includes a role of a particular array that received the promotion request as a one of a preferred array or a non-preferred array.

6. The system of claim 2, wherein the promotion procedure is performed automatically without user intervention, and wherein performing the promotion procedure further comprises enabling production access on the selected volume.

7. The system of claim 6, wherein the selected volume is the first volume, and wherein enabling production access includes enabling host access and application access on the first volume to allow access to the cluster volume upon a determination that the second volume is unavailable.

8. The system of claim 7, the at least one processing device being further configured to implement the following steps:

prior to enabling production access:
taking a snapshot of the selected volume, and
disabling snapshot creation on the selected volume, and
resuming snapshot creation on the selected volume only after completion of enabling production access.

9. The system of claim 8, wherein resuming snapshot creation on the selected volume further comprises enabling a data protection policy for the selected volume, wherein the data protection policy includes one or more snapshot rules.

10. The system of claim 1, the at least one processing device being further configured to implement the following steps:

in response to receiving the promotion request:
determining a result of the promotion procedure;
generating a preview of the result; and
visualizing the preview of the result before performing the promotion procedure;
wherein the promotion procedure is performed in response to receiving, from a user, an acknowledgment of the preview of the result.

11. The system of claim 1, wherein the selected volume comprises a non-preferred volume.

12. The system of claim 1, wherein the cluster volume comprises a metro volume.

13. A method comprising:

receiving a promotion request directed to a selected volume of a cluster volume, wherein the cluster volume is established between a first volume in a first array and a second volume in a second array, and the selected volume is one of the first and the second volume;

collecting a plurality of metrics that indicate respective characteristics associated with the cluster volume; and in response to receiving the promotion request:
comparing the plurality of metrics with a database that associates multiple permutations of metrics with respective conditions for promoting the selected volume, determining, based at least in part on the comparison, a target condition set having a permutation of metrics that matches the plurality of metrics, and performing a promotion procedure on the selected volume upon a determination that the target condition set is satisfied.

14. The method of claim 13, wherein the first volume and the second volume are configured to perform bidirectional replication, and the plurality of metrics includes a state of network connectivity between the first array and the second array, the state of network connectivity indicating that a bidirectional replication session between the first volume and the second volume has been fractured or paused.

15. The method of claim 14,
wherein the promotion procedure is performed automatically without user intervention,
wherein performing the promotion procedure further comprises enabling production access on the selected volume, and wherein the selected volume is the first volume, and
wherein enabling production access includes enabling host access and application access on the first volume to allow access to the cluster volume upon a determination that the second volume is unavailable.

16. The method of claim 15, further comprising:
prior to enabling production access:
taking a snapshot of the selected volume, and
disabling snapshot creation on the selected volume, and
resuming snapshot creation on the selected volume only after completion of enabling production access.

17. The method of claim 16, wherein resuming snapshot creation on the selected volume further comprises enabling a data protection policy for the selected volume, wherein the data protection policy includes one or more snapshot rules.

18. The method of claim 13, further comprising, in response to receiving the promotion request:
determining a result of the promotion procedure;
generating a preview of the result; and
visualizing the preview of the result before performing the promotion procedure;
wherein the promotion procedure is performed in response to receiving, from a user, an acknowledgment of the preview of the result.

19. The method of claim 13, wherein the selected volume comprises a non-preferred volume.

20. A non-transitory processor-readable storage medium having stored thereon program code of one or more software programs, wherein the program code when executed by at least one processing device causes the at least one processing device to perform the following steps:

receiving a promotion request directed to a selected volume of a cluster volume, wherein the cluster volume is established between a first volume in a first array and a second volume in a second array, and the selected volume is one of the first and the second volume;

collecting a plurality of metrics that indicate respective characteristics associated with the cluster volume; and in response to receiving the promotion request:

comparing the plurality of metrics with a database that associates multiple permutations of metrics with respective conditions for promoting the selected volume, determining, based at least in part on the comparison, a target condition set having a permutation of metrics that matches the plurality of metrics, and performing a promotion procedure on the selected volume upon a determination that the target condition set is satisfied.

* * * * *